Patented June 22, 1937

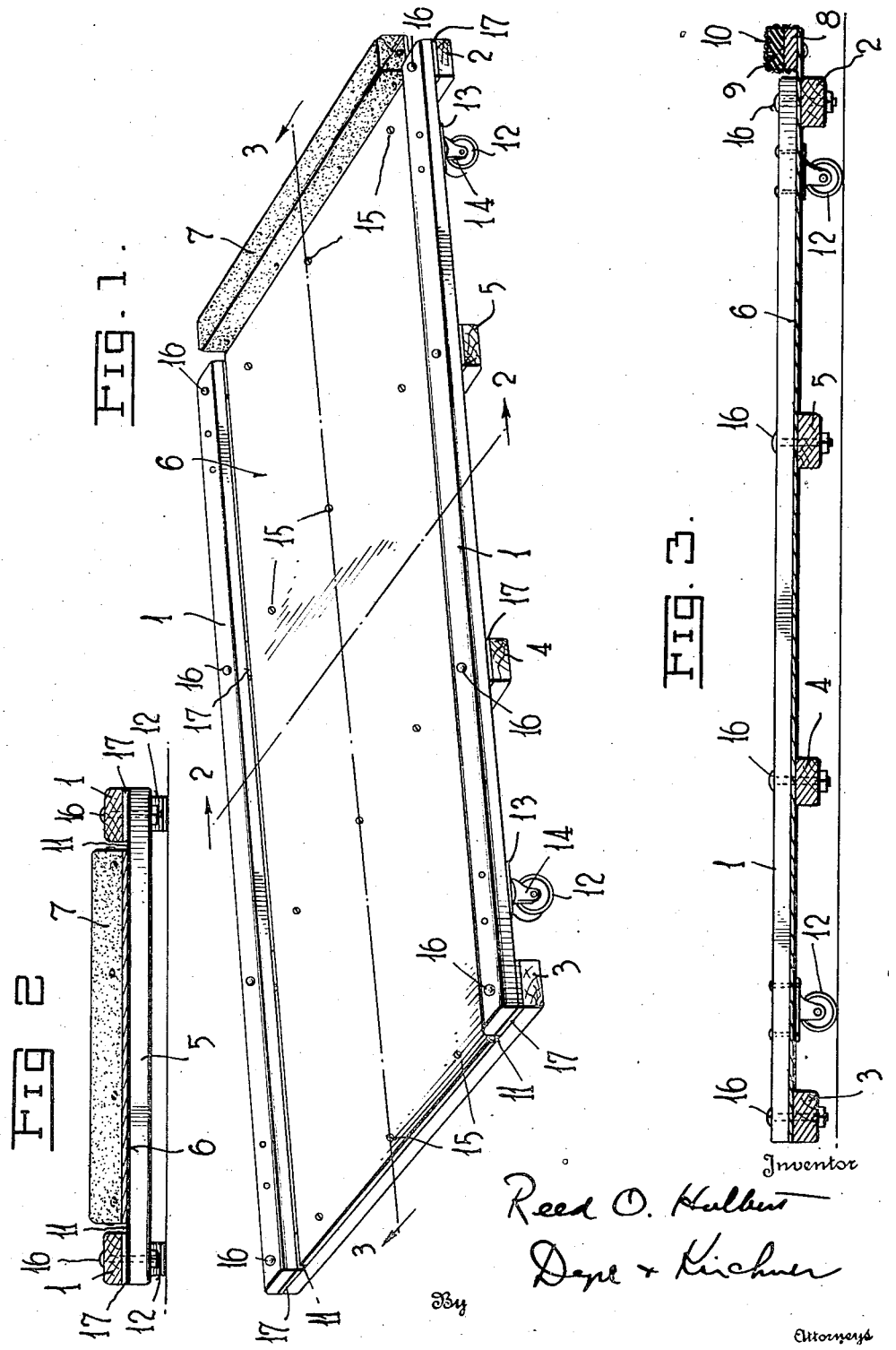

2,084,957

UNITED STATES PATENT OFFICE 2,084,957

CREEPER

Reed O. Hulbert, Ashtabula, Ohio

Application August 24, 1936, Serial No. 97,675

4 Claims. (Cl. 280—61.5)

My invention relates to mechanics' creepers, i. e., low-lying wheeled carriages used by repairmen to propel themselves to points under automobiles and the like.

Objects of the invention are generally to provide a creeper construction which will be superior to those of the prior art in simplicity, economy of manufacture, and durability, particularly under stress of abnormal or accidental loads.

Creepers of the class to which the present invention belongs are generally subjected to hard use and abuse. It is not uncommon for them to be run over by automotive vehicles, and no prior art creeper of which I am aware is capable of successfully withstanding the loads imposed by such accidents. The present invention contemplates a creeper so constructed that its parts will not become broken or separated from each other, but will yield without fracture, separation, loosening, or more than momentary distortion under such abnormal loads. To this end the creeper frame is made, not of metal, which is objectionably expensive and permanently distortable, but of comparatively yieldable and resilient material like wood, preferably hardwood, which is relatively inexpensive and capable of being temporarily deformed without fracture under accidental heavy loads and of promptly springing back to its original form upon release of such loads.

A further object of the invention is to provide a creeper of unusually low height with casters or supporting wheels of comparatively large size and hence of increased strength. As creepers have heretofore been constructed, the use of large casters has resulted in raising the bed of the creeper objectionably high, and, conversely, making the creeper low has required small, and hence fragile, casters to be used. By a novel disposition of the casters and a new arrangement of the frame and other parts, I am able to mount an unusually low creeper on unusually large casters.

Additional important features of the invention include certain novel relationships of the frame and other parts which cooperate with the particular materials in attaining the foregoing objects.

Other objects and advantages of the invention will be evident from the following description of the invention in a particular form of embodiment which is at present preferred inasmuch as the same has been found to give satisfactory and reliable results in actual practice.

The invention is illustrated in the preferred form of embodiment by the accompanying drawing in which like reference characters designate the same part in the several views and in which:

Figure 1 is a perspective view of a creeper embodying the invention;

Fig. 2 is a cross section taken on the line 2—2 of Fig. 1; and

Fig. 3 is a longitudinal section taken on the line 3—3 of Fig. 1.

The creeper comprises a frame including side rails 1, 1, formed preferably of hardwood or equivalent relatively yielding and resilient material. The frame is of generally rectangular shape, the side rails being connected by a plurality of cross members made of material similar to that of the side rails, including the head end member 2, the foot end member 3 and preferably a plurality of intermediate cross members 4, 5. To the several cross members, in the space between the side rails, there is screwed or otherwise secured a body board 6 on which the operator rests, back down, when using the creeper. The body board may be extended slightly beyond the head end member 2 to accommodate a head rest 7, which may comprise a thin base strip 8 of wood and a superposed pad 9 of sponge rubber or the like covered by a sheet 10 of leather or the like.

The body board 6 is preferably made of plywood, since a thin sheet of this material provides all the strength and resilience of a much thicker integral board. To drain off water and other liquids which might fall upon the body board when the creeper is in use the board may be made somewhat narrower than the distance between the side rails 1 so that a space 11 is provided between each edge of the body board and the adjacent side rail.

A caster or equivalent wheel means 12 mounts the creeper at each corner zone thereof. The casters are of the usual type, including an attaching plate 13 and a pedestal or bracket 14 swivelled on the plate and carrying the axle on which the roller is journalled. A feature of the invention which I deem to be of importance consists in mounting the attaching plate 13 of each caster on the underside of the side rails, as shown in the drawing. Such mounting permits the use of relatively large, and hence rugged and durable caster assemblies, without objectionably increasing the height of the creeper. It is obvious that if the caster assemblies were mounted beneath the cross members the rollers would have to be of materially reduced diameter or the elevation of the creeper would be objectionably high.

The body board 1 is mounted directly on the cross members by wood screws or the like 15, and the cross members themselves are bolted or otherwise secured to the side rails as shown at 16. To depress the level of the body board and for a purpose hereinafter explained, there is interposed between each side rail and the connected portion of each cross member a shim 17, which may be a block or a plurality of blocks of wood or the like. The shims 17 may be conveniently made of the same plywood material of which the body board is made. The effect of using these shims is to depress the level of the body board and the level of the underside of each of the cross members. The low disposition of the body board on which the operator rests permits the operator to propel himself with ease under low-slung vehicles, and the low disposition of the under surfaces of the cross members brings these surfaces close to the ground.

As has been noted hereinabove, creepers are not uncommonly run over by automotive vehicles. If the wheel of such a vehicle passes over the creeper which has been described, momentary deformation of the creeper parts is the only effect. If the load of such a vehicle be applied longitudinally of the creeper, say along the section line 3—3 of Fig. 1, the cross members and body board yield because of their inherent elasticity until the low-slung zones of the cross members immediately beneath the vehicle wheel contact the floor and no damage is done to the creeper. If the vehicle wheel passes transversely over the creeper, say along the section line 2—2 of Fig. 1, the side rails and body board yield until intermediate cross members 4, 5, or the bolt heads or ends which project therefrom, engage the floor. The spacing between cross members 4 and 5 is sufficiently short to give the intervening length of side rail sufficient stiffness and strength to withstand the abnormal load. Substantially short spacings between the casters and the adjacent cross members achieve the same effect. If the vehicle wheel passes diagonally across the creeper a combination of the resistances just explained serves to withstand the abnormal weight. I have found by actual test that no accident involving passage of a heavy vehicle over the creeper, regardless of the direction taken by the vehicle wheel over the creeper, results in destruction, loosening, separation, or more than momentary deformation of the creeper parts.

The elevation of the side rails above the body board provides a convenient abutment for the shoulders of the operator against which he may push to move the creeper laterally or diagonally when in use.

It will of course be understood that in place of shims 17, the cross members may be made of wooden bars originally of the thickness of the combined cross bars and shims, as shown, rabbeted between the side rail engaging end portions to receive the body board in substantially depressed position. It is of course more convenient to employ cross members of uniform thickness with shims interposed between the members and the rails, as shown.

The disclosure of the invention in one preferred form of embodiment only is for purposes of illustration and not limitation. It is to be understood that the invention is capable of embodiment in other and modified forms, and all such modifications, to the extent that they incorporate the principles of the invention as defined by the appended claims, are to be deemed within the scope and purview thereof.

I claim:

1. A creeper comprising a pair of longitudinal side rails, casters supporting said rails and mounted directly on the under surface thereof, cross members connecting the rails, shims interposed between the adjacent surfaces of said members and rails to space the members below the rails, and a body supported on the cross members between the rails.

2. A creeper comprising a pair of longitudinal side rails, casters supporting said rails on the ground and mounted on the rails so as to project below the under surface thereof, cross members connecting the rails, disposed beneath the rails, and having flat upper surfaces intermediate the rails, an occupant supporting body supported on the portions of the cross members intermediate the rails, and means engaged with the under surfaces of the rails spacing said intermediate portions of the cross members below the level of the rails and normally above the ground.

3. A creeper comprising a pair of longitudinal side rails, casters supporting said rails on the ground and mounted on the rails so as to project below the under surface thereof, cross members connecting the rails, an occupant supporting body comprising a relatively thin and strong continuous sheet of plywood supported on the portions of the cross members intermediate the rails, and means engaged with the under surfaces of the rails spacing said intermediate portions of the cross members below the level of the rails and normally above the ground.

4. A creeper comprising a pair of longitudinal side rails, casters supporting said rails and mounted directly on the under surface thereof, cross members connecting the rails, shims interposed between the adjacent surfaces of said members and rails to space the members below the rails, and an occupant supporting body comprising a relatively thin and strong continuous sheet of plywood supported on the cross members between the rails.

REED O. HULBERT.